United States Patent [19]

Oda

[11] Patent Number: 5,237,973

[45] Date of Patent: Aug. 24, 1993

[54] FOUR-STROKE CYCLE ENGINE

[75] Inventor: Hideharu Oda, Hamamatsu, Japan

[73] Assignee: Suzuki Kabushiki Kaisha, Japan

[21] Appl. No.: 975,594

[22] Filed: Nov. 12, 1992

[30] Foreign Application Priority Data

Nov. 13, 1991 [JP] Japan .................. 3-297348
Nov. 15, 1991 [JP] Japan .................. 3-300493

[51] Int. Cl.⁵ .................. F02B 23/00; F02M 25/07
[52] U.S. Cl. .................. 123/432; 123/568; 123/662
[58] Field of Search .............. 123/308, 432, 568, 569, 123/302, 661, 662

[56] References Cited

U.S. PATENT DOCUMENTS

| | | | |
|---|---|---|---|
| 1,894,667 | 1/1933 | Church et al. | 123/310 |
| 4,160,430 | 7/1979 | Bell | 123/432 |
| 4,246,874 | 1/1981 | Nakagawa et al. | 123/432 X |
| 4,270,500 | 6/1981 | Nakagawa et al. | 123/432 X |
| 4,494,504 | 1/1985 | Yagi et al. | 123/432 X |
| 4,834,048 | 5/1989 | Adamis et al. | 123/432 |
| 5,094,210 | 3/1992 | Endres et al. | 123/432 |

FOREIGN PATENT DOCUMENTS

2012632 10/1970 Fed. Rep. of Germany ...... 123/662

Primary Examiner—Willis R. Wolfe
Attorney, Agent, or Firm—Bruce L. Adams; Van C. Wilks

[57] ABSTRACT

In a four-stroke cycle engine in which a combustion chamber is formed by a piston accommodated in a cylinder block and a cylinder head disposed in the cylinder block and respective two suction valves and two exhaust valves are disposed in the combustion chamber, the combustion chamber is divided into two combustion sections each in which one of the suction valves and one of the exhaust valves are disposed. A mixture in a theoretical air-fuel ratio is fed into one of the divided combustion sections and a mixture in an air-fuel ratio corresponding to an engine load is fed into another one of the divided combustion sections, and the air-fuel ratio being changed in response to the engine load. In a case where the mixture in an air-fuel ratio includes an exhaust gas, substantially the same operation is performed, but in this case, the degree of opening of an exhaust gas recirculation valve is controlled so as to control the air-fuel ratio of the mixture.

6 Claims, 13 Drawing Sheets

| CYLINDER No. | DIVIDED COMBUSTION CHAMBER | STROKE | | | | | | | | | | | |
|---|---|---|---|---|---|---|---|---|---|---|---|---|---|
| ♯1 | | A | B | C | D | A | B | C | D | A | B | C | D |
| | R | ○ | | | △ | | | ○ | | | △ | | |
| | L | △ | | | ○ | | | △ | | | ○ | | |
| ♯2 | | B | C | D | A | B | C | D | A | B | C | D | A |
| | R | | | ○ | | | | △ | | | ○ | | △ |
| | L | | △ | | | | ○ | | | △ | | | ○ |
| ♯3 | | D | A | B | C | D | A | B | C | D | A | B | C |
| | R | | ○ | | | △ | | | ○ | | | △ | | 
| | L | △ | | | ○ | | | △ | | | ○ | | |
| ♯4 | | C | D | A | B | C | D | A | B | C | D | A | B |
| | R | | ○ | | | △ | | | ○ | | | △ | | |
| | L | △ | | | ○ | | | △ | | | ○ | | |

○ : MIXTURE IN THEORETICAL AIR-FUEL RATIO

△ : MIXTURE IN VARIABL AIR-FUEL RATIO (R: RIGHT SIDE; L: LEFT SIDE)

A : SUCTION
B : COMPRESSION
C : EXPLOSION
D : EXHAUST

FOUR-STROKE CYCLE ENGINE

BACKGROUND OF THE INVENTION

This invention relates to a four-stroke cycle engine particularly having an improved combustion chamber structure.

In gasoline engines, an engine ready for varying the number of actuating cylinders has been proposed for an object of enhancing a fuel consumption. In the case of four-stroke cycle engine, for example, a construction of the actuating cylinders are all actuated at the time when the engine is on a full load, but two cylinders are only actuated when the engine is on a partial load by cutting ignition of other two cylinders, for example, out of the four cylinders. An arrangement is therefore such that the number of actuating cylinders will properly be adjusted, thereby saving a fuel supply to the engine for enhancing the fuel consumption.

However, in the case of actuating cylinder number variable engine described above, since the cylinders actuated at the time of ignition cutting or reignition change in number, a resultant impact is considerably large, and thus a smooth drive feeling is capable of being spoiled inevitably.

SUMMARY OF THE INVENTION

An object of this invention is to substantially eliminate defects or drawbacks encountered in the prior art and to provide a four-stroke cycle engine ready for lean burning as keeping a driving feeling good to enhance a fuel consumption.

Another object of this invention is to provide a four-stroke cycle engine further capable of suppressing a generation of nitrogen oxides.

These and other objects can be achieved according to this invention by providing, in one aspect, a four-stroke cycle engine in which a combustion chamber is formed by a piston accommodated in a cylinder block and a cylinder head disposed in the cylinder block and respective two suction valves and two exhaust valves are disposed in the combustion chamber, and in the improvement in which the combustion chamber is divided into two combustion sections each in which one of the suction valves and one of the exhaust valves are disposed, a mixture in a theoretical air-fuel ratio is fed into one of the divided combustion sections and a mixture in an air-fuel ratio corresponding to an engine load is fed into another one of the divided combustion sections, the air-fuel ratio being changed in response to the engine load.

In a preferred embodiment, an engine revolution number is detected by a sensor, a degree of opening of a throttle valve is detected by a sensor, an amount of fuel to be supplied is controlled by a control unit in response to signals from both the sensors, a mixture in a theoretical air-fuel ratio is fed to one of the combustion sections and the air-fuel ratio of a mixture to be fed into another one of the combustion sections is controlled to change the fuel supply amount in response to the degree of opening of the throttle valve with respect to the engine revolution numbers. At an engine low load operation period in which the degree of opening of the throttle valve is made small with respect to the engine revolution number, the air-fuel ratio of the mixture to be fed to another one of the combustion sections is made large and, on the contrary, at an engine high load operation period in which the degree of opening of the throttle valve is made large with respect to the engine revolution number, the air-fuel ratio of the mixture to be fed to another one of the combustion sections is made small.

In another aspect of the present invention, there is provided a four-stroke cycle engine in which a combustion chamber is formed by a piston accommodated in a cylinder block and a cylinder head disposed in the cylinder block and respective two suction valves and two exhaust valves are disposed in the combustion chamber, and in the improvement in which the combustion chamber is divided into two combustion sections each in which one of the suction valves and one of the exhaust valves are disposed, a mixture in a theoretical air-fuel ratio is fed into one of the divided combustion sections and a mixture including an exhaust gas in an air-fuel ratio corresponding to an engine load is fed into another one of the divided combustion sections, the air-fuel ratio being changed in response to the engine load.

In a preferred embodiment, an engine revolution number is detected by a sensor, a degree of opening of a throttle valve is detected by a sensor, an exhaust gas recirculation valve means is incorporated in association with the combustion chamber, a degree of opening of the exhaust gas recirculation valve means is controlled by a control unit in response to signals from both the sensors, a mixture in a theoretical air-fuel ratio is fed to one of the combustion sections and the air-fuel ratio of a mixture, including an exhaust gas through the exhaust gas recirculation valve means, is fed into another one of the combustion sections is controlled to change the air-fuel ratio of the mixture including the exhaust gas in response to the engine load. At an engine low load operation period in which the degree of opening of the throttle valve is made small with respect to the engine revolution number, the degree of opening of the exhaust gas recirculation valve means is made large and on the contrary, at an engine high load operation period in which the degree of opening of the throttle valve is made large with respect to the engine revolution number, the degree of opening of the exhaust gas recirculation valve means is made small.

In consequence, according to the four-stroke cycle engine relating to this invention, since a mixture in theoretical air-fuel ratio is fed to one of the divided combustion chambers all the time, and an air-fuel ratio of the mixture fed to the other divided combustion chamber changes, a dilute mixture with thin fuel and large air-fuel ratio is fed to the other divided combustion chamber at the time when the engine is on low and medium loads. Thus, the other divided combustion chamber is ready for lean burning, and a fuel consumption of the engine may be enhanced as a whole.

Additionally, since a normal combustion is realized at all times in the divided combustion chamber to which a theoretical air-fuel ratio is provided, all the cylinders are actuated all the time after all. Accordingly, an impact to arise at the time of reactuation of the cylinders after stop as in the case of actuating cylinder number variable engine will be removed, thus realizing a smooth drive feeling.

Further, an oxygen content in an exhaust gas is very small in the divided combustion chamber to which the exhaust gas is fed, therefore, a nitrogen oxide is reduced securely at the time when a lean burning is carried out in the divided combustion chamber, and thus, a generation of the nitrogen oxide at the time of lean burnig can be suppressed.

DESCRIPTION OF THE PREFERRED EMBODIMENTS

Figure 1:
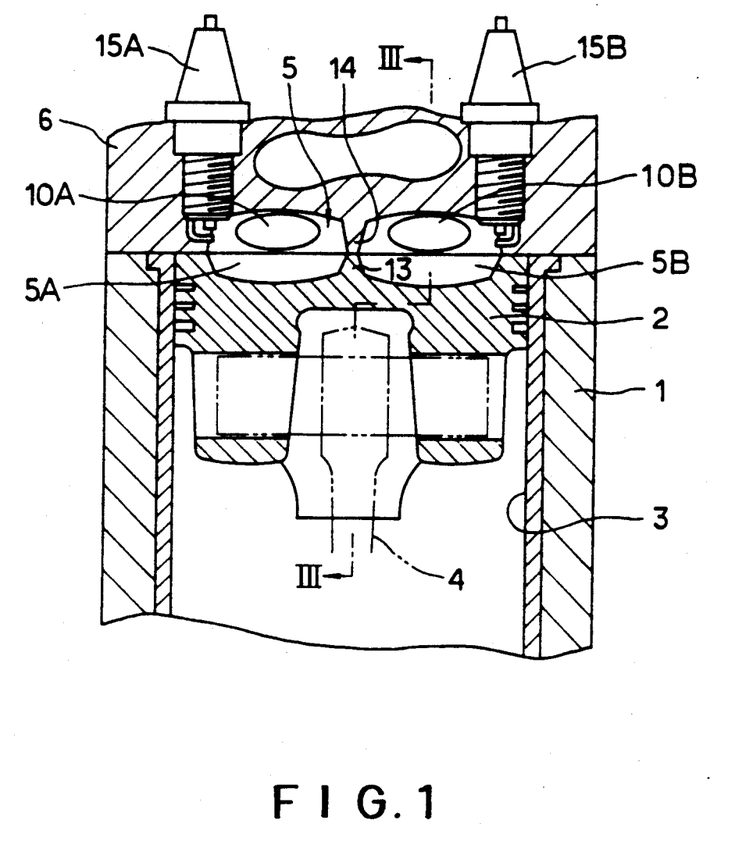
FIG. 1 is a sectional view of a combustion chamber of a four-stroke cycle engine shown in FIG. 4.
Figure 3:
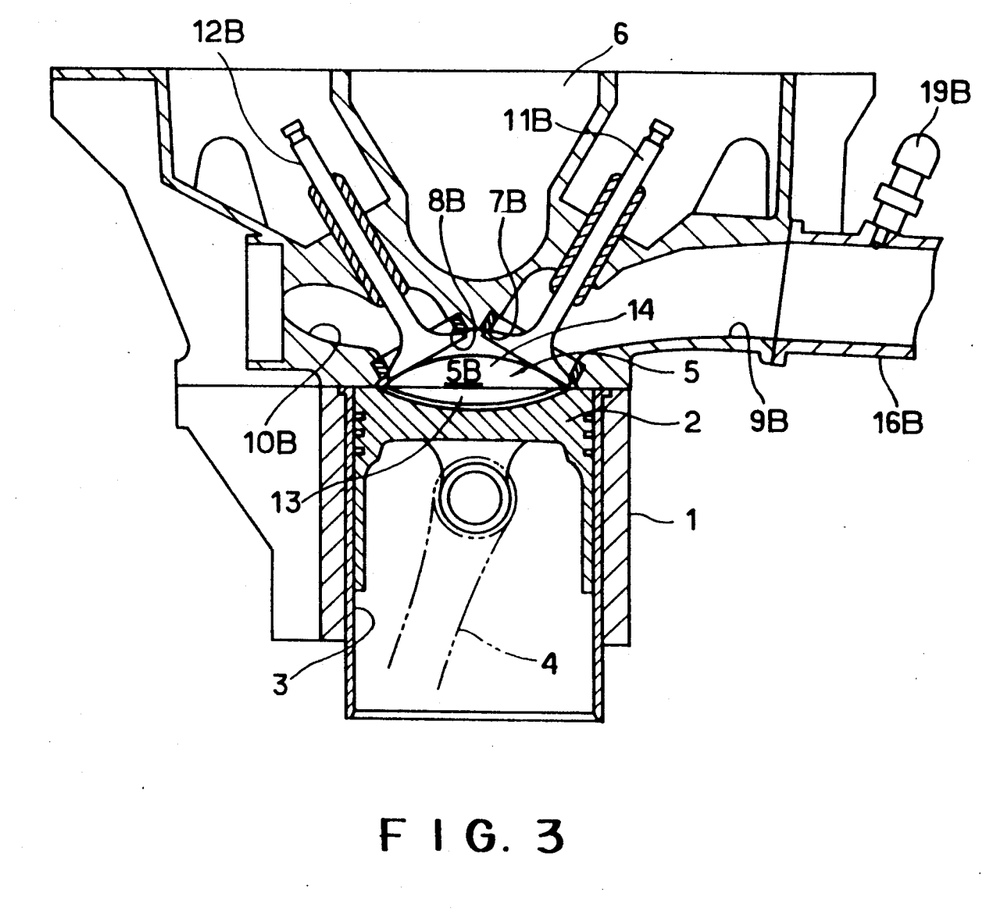
FIG. 3 is a sectional view taken on line III - III of FIG. 1.
Figure 4:
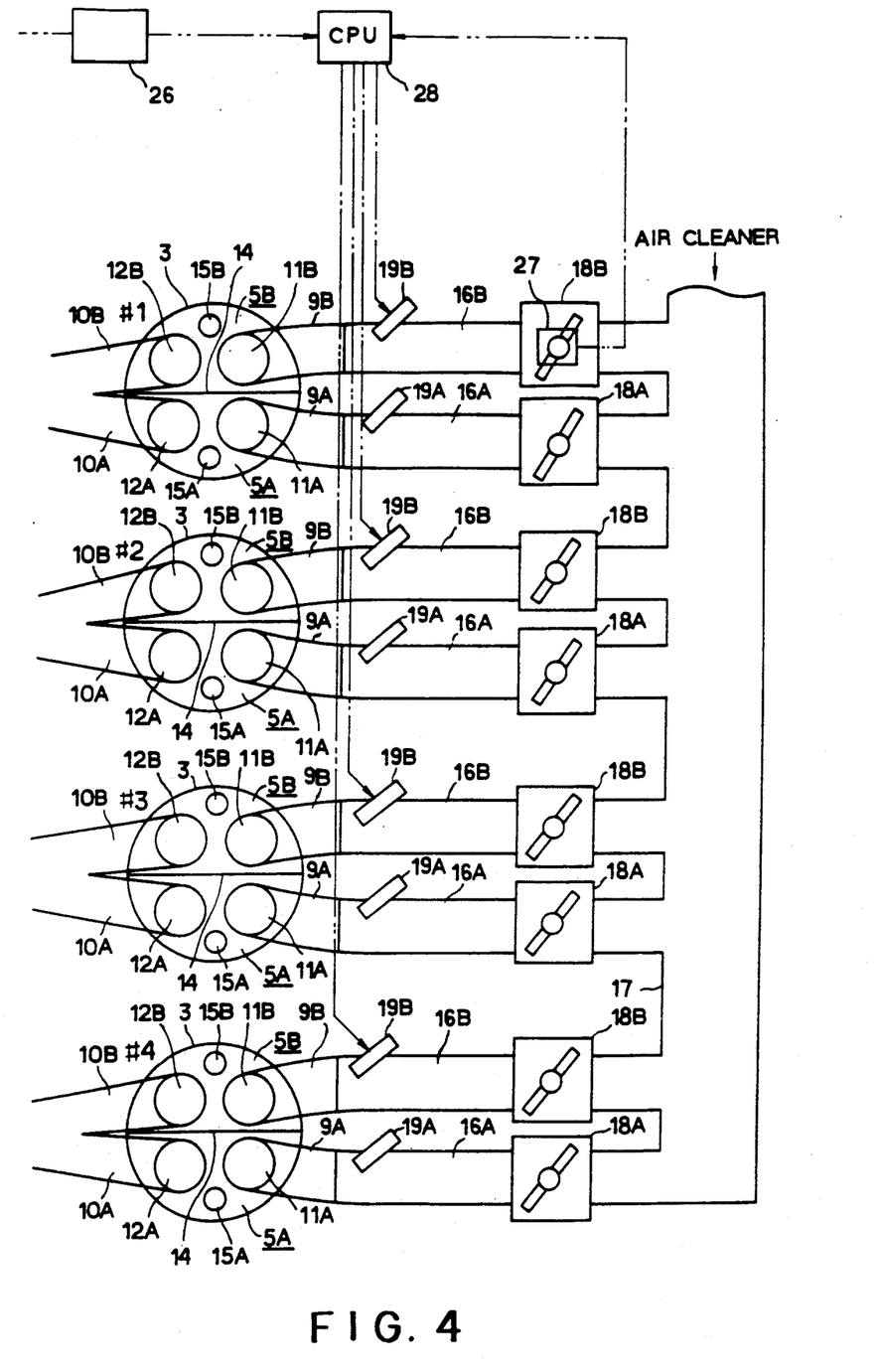
FIG. 4 is a schematic view showing a combustion chamber and a suction system of an engine in a first example of a first embodiment of the four-stroke cycle engine relating to this invention.

FIG. 1 is a sectional view of an engine combustion chamber of a four-stroke cycle engine according the present invention. FIG. 3 is a sectional view taken along the line III—III of FIG. 1, and FIG. 4 is a schematic view showing a first example of a first embodiment of a combustion chamber and a suction system of the four-stroke cycle engine of FIG. 1.

As shown in FIG. 3, the four-stroke cycle engine according to this invention is a 4-cylinder in-line engine with a cylinder 3 enclosing a piston 2 therein disposed in four in line on cylinder block 1. The piston 2 is coupled to one crankshaft not indicated through a control rod 4, and the crankshaft is enclosed rotatably within a crank chamber, not indicated, provided with the cylinder block 1.

Figure 2:
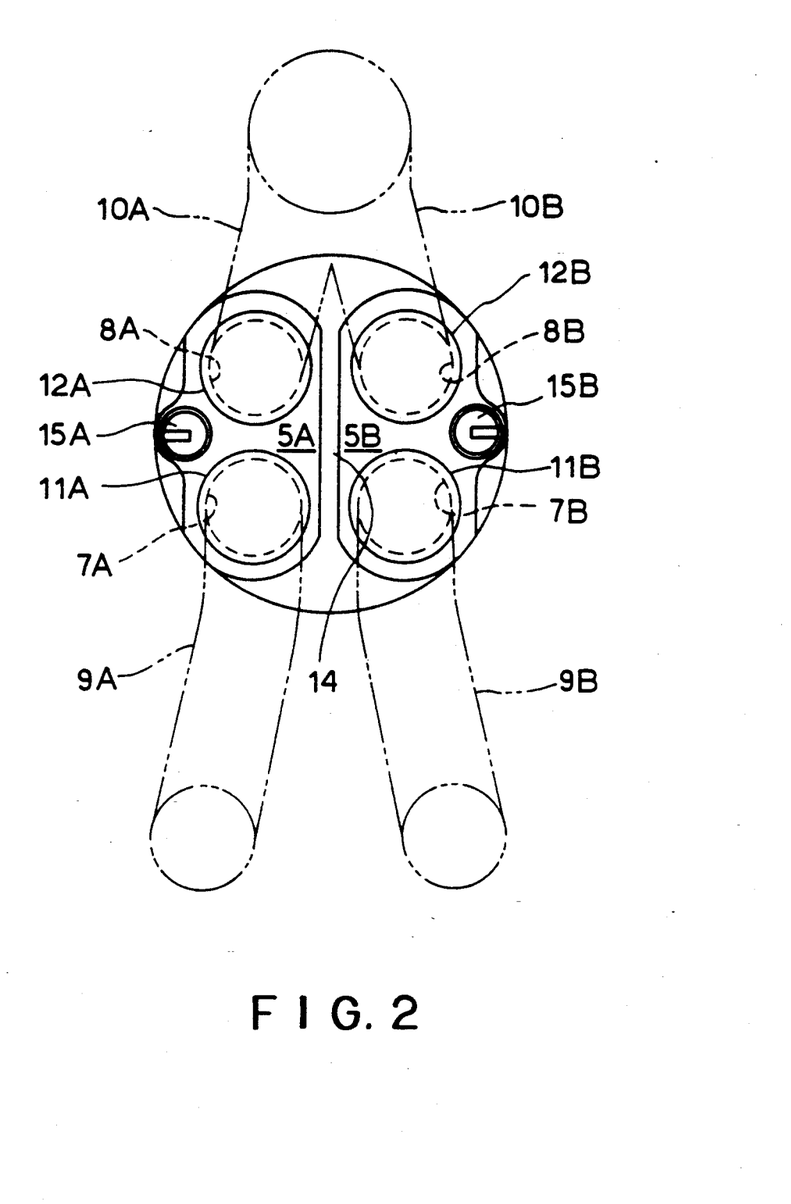
FIG. 2 is a view showing the combustion chamber of FIG. 1 which is taken from a piston side.

A cylinder head 6 forming an individual combustion chamber 5 between each piston 2 is provided on the cylinder block 1, and a head cover not indicated is placed on the cylinder head 6. The cylinder head 6 is perforated with an L-side suction hole 7A and an R-side suction hole 7B, an L-side exhaust hole 8A and an R-side exhaust hole 8B, as shown in FIG. 2, at every combustion chambers 5. Then, as shown in FIG. 3, an L-side suction port 9A and an R-side suction port 9B extend from these L-side suction hole 7A and R-side suction hole 7B respectively, and an L-side exhaust port 10A and an R-side exhaust port 10B extend from the L-side exhaust hole 8A and R-side exhaust hole 8B respectively. These L-side exhaust port 10A and R-side exhaust port 10B are formed to be joined together.

In the above and following, the term "L-side" means a left-side and the term "R-side" means a rignt side as viewed in the state of FIG. 2.

Further, as shown in FIG. 3, an L-side suction valve 11A and an R-side suction valve 11B are disposed on the L-side suction hole 7A and the R-side suction hole 7B respectively, and an L-side exhaust valve 12A and an R-side exhaust valve 12B are disposed on the L-side exhaust hole 8A and the R-side exhaust hole 8B, respectively. These L-side suction valve 11A and R-side exhaust valve 11B, L-side exhaust valve 12A and R-side exhaust valve 12B are actuated by a valve actuator not indicated according to a stroke of the four-stroke cycle engine. More specifically, the L-side suction valve 11A and the R-side suction valve 11B are actuated to open to introduce a mixture into the combustion chamber 5 at a suction stroke of these suction, compression, explosion and exhaust strokes of the four-stroke cycle engine, and the L-side exhaust valve 12A and the R-side exhaust valve 12B are actuated to open to exhaust a waste gas of the combustion chamber 5 at the exhaust stroke.

Now, as shown in FIG. 1, each combustion chamber 5 is partitioned into an L-side divided combustion chamber 5A and an R-side divided combustion chamber 5B. The partition is constructed from a piston-side diaphragm 13 provided upright on top of the piston 2 and a cylinder head-side diaphragm 14 provided vertically within the combustion chamber 5 of the cylinder head 6 coming to contact with each other at the time of a top dead center of the piston 2.

The cylinder head-side diaphragm 14 is formed, as shown in FIG. 2, covering the range from a central position of the L-side suction hole 7A and the R-side suction hole 7B to a central position of the L-side exhaust hole 8A and the R-side exhaust hole 8B, and the piston-side diaphragm 13 is formed in correspondence to a position of the cylinder head-side diaphragm 14. Thus, the L-side suction valve 11A and the L-side exhaust valve 12A are disposed in the L-side divided combustion chamber 5A, and the R-side suction valve 11B and the R-side exhaust valve 12B are disposed in the R-side divided combustion chamber 5B. Further, on the cylinder head 6, an L-side ignition plug 15A and an R-side ignition plug 15B one piecce each are provided in the L-side divided combustion chamber 5A and the R-side divided combustion chamber 5B, respectively.

Accordingly, a mixture from the L-side suction port 9A is introduced into the L-side divided combustion chamber 5A by way of the L-side suction valve 11A, the introduced mixture is ignited to burn by the L-side ignition plug 15A, and a produced waste gas is exhausted from the L-side exhaust port 10A by way of the L-side exhaust valve 12A. Similarly, a mixture from the R-side suction port 9B is introduced into the R-side divided combustion chamber 5B by way of the R-side suction valve 11B, the introduced mixture is ignited to burn by the R-side ignition plug 15B, and a produced waste gas is exhausted from the R-side exhaust port 10B by way of the R-side exhaust valve 12B. In this connection, since the pistons 2 are identical to each other, the L-side divided combustion chamber 5A and the R-side divided combustion chamber 5B of a cylinder carry out the same stroke concurrently. For example, in the cylinder 3 with a cylinder No. 1 (# 1) (see FIGS. 4 and 5), both the L-side divided combustion chamber 5A and R-side divided combustion chamber 5B carry out the suction stroke concurrently and then the compression stroke next concurrently.

The L-side suction port 9A and the R-side suction port 9B of each cylinder 3 into which a mixture is introduced are independent as shown in FIG. 4, and an L-side suction manifold 16A and an R-side suction manifold 16B are connected to each port. These L-side and R-side suction manifolds 16A and 16B are connected to a surge tank 17, leading air from an air cleaner. The L-side suction manifold 16A is provided with an L-side throttle valve 18A and an L-side fuel injector 19A, and the R-side suction manifold 16B is provided with an R-side throttle valve 18B and an R-side fuel injector 19B.

Figure 5:
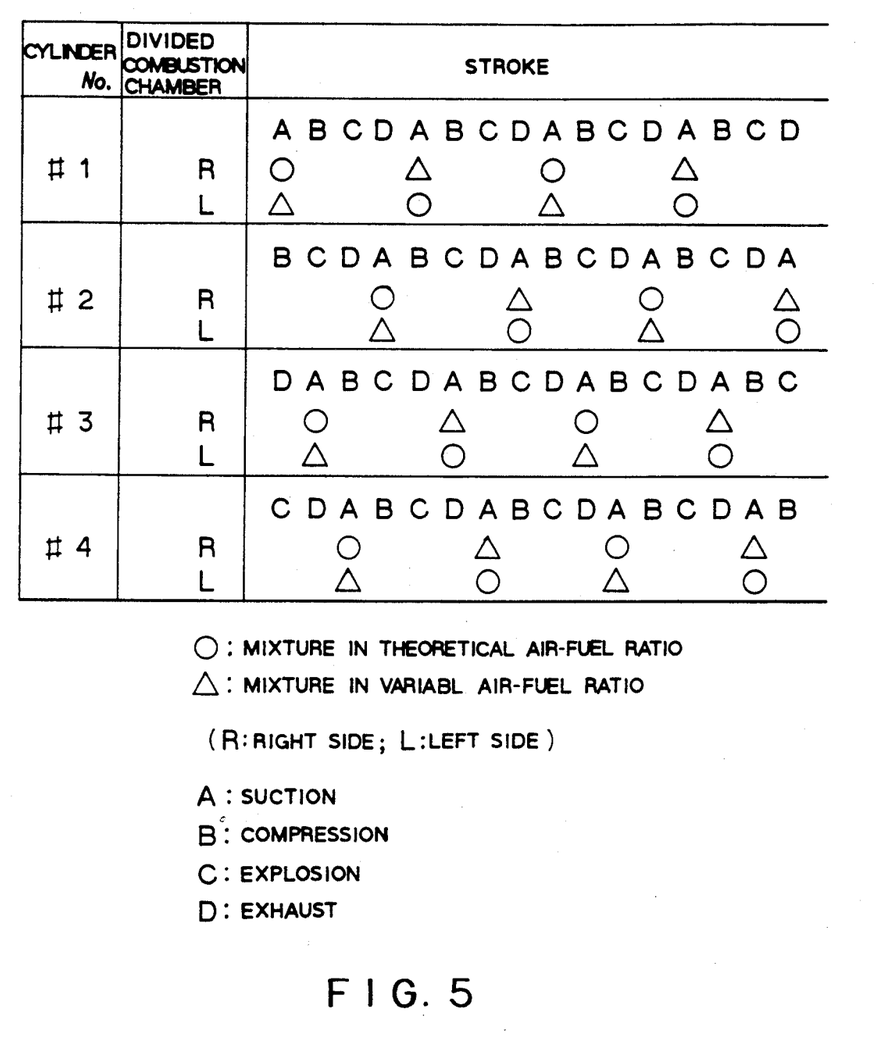
FIG. 5 is a view showing relationship between air-fuel mixture to be fed to respective divided combustion chambers of FIG. 1 and respective strokes of a four-stroke cycle engine.

Further, the mixture in a predetermined air-fuel ratio is fed to each L-side divided combustion chamber 5A and R-side divided combustion chamber 5B by injection of a fuel from the L-side fuel injector 19A and the R-side fuel injector 19B. The amounts of the fuel injection from the respective L- and R-side fuel injectors 19A and 19B are adjusted so that the mixture to be fed to one of the L- and R-side divided combustion chambers 5A and 5B always has a theoretical air-fuel ratio whereas the mixture to be fed to the other one of the divided combustion chambers 5A and 5B has an air-fuel ratio changeable in accordance with the engine load. Furthermore, the adjustment of the fuel injection amounts is performed so that, as shown in FIG. 5, the mixture of the theoretical air-fuel ratio and the mixture of the air-fuel ratio corresponding to the engine load are fed alternatingly every each suction process to the L- and R-side divided combustion chambers 5A and 5B. In FIG. 5, the respective cylinders have burning orders of #1-#3-#4-#2.

The four-stroke cycle engine of this embodiment is equipped with a sensor 26 for detecting an engine revolution number, a sensor 27 for detecting a degree of opening of a throttle valve 18A (18B) and a computing means such as central processing unit CPU 28 for controlling the air-fuel ratio to change the fuel supply amount to the fuel injector 19A (19B) in response to signals from the sensors 26 and 27. In FIG. 4, the lines are only connected to the fuel injectors 19B, but the lines from the CPU 28 are also connected to the injectors 19A. However, it is to be easily noted that both the fuel injectors 19A and 19B are not operated at the same time. The line from the CPU 28 can be connected to only one sensor 27 for the one throttle valve 18B, but the lines may be connected to all the throttle valves.

In the operation, at the engine low load operation period in which the degree of opening of the throttle valve 18A (18B) is made small with respect to the engine revolution number, the amount of the fuel to be supplied to the fuel injector 19A (19B) is made small under the control of the CPU 28 and the air-fuel ratio of the mixture supplied to the divided combustion chamber 5A (5B) is made high. On the contrary, In the operation, at the engine high load operation period in which the degree of opening of the throttle valve 18A (18B) is made large with respect to the engine revolution number, the amount of the fuel to be supplied to the fuel injector 19A (19B) is made large under the control of the CPU 28 and the air-fuel ratio of the mixture supplied to the divided combustion chamber 5A (5B) is made small.

In the manner described above, the mixture of the air-fuel ratio corresponding to the engine load can be always supplied to either one of the divided combustion chambers 5A and 5B.

Here, the mixture in the air-fuel ratio corresponding to an engine load refers to a mixture in a theoretical air-fuel ratio at the time of engine high load, to a mixture with the air-fuel ratio larger and thinner than the theoretical air-fuel ratio at the time of engine medium load, and to a dilute mixture with the air-fuel ratio still larger than that at the time of medium load when the engine is on a low load, including the case of air only. Thus, a normal combustion is performed in one of the L- and R-side divided combustion chambers 5A and 5B according to the mixture in a theoretical air-fuel ratio, and a lean burning is performed in the other one of the L- and R-side divided combustion chambers 5A and 5B according to the thin mixture corresponding to the engine load. Particularly, since the mixture in a theoretical air-fuel ratio is fed to both the L- and R-side divided combustion chambers 5A and 5B, the normal burning is carried out in both the L- and R-side divided combustion chambers 5A and 5B.

According to the above-described example, a mixture in a theoretical air-fuel ratio is fed to one of the L- and R-side divided combustion chambers 5A and 5B, for example, the L-side divided combustion chamber 5A, and a mixture in the air-fuel ratio is fed to the other one of the L- and R-side divided combustion chambers 5A and 5B, for example, the R-side divided combustion chamber 5B, a mixture in an air-fuel ratio according to the engine load is fed to the R-side divided combustion chamber 5B, therefore a thin mixture with a large air-fuel ratio is fed to the R-side divided combustion chamber 5B at the time when the engine is on a low load and medium load. In consequence, a lean burning is performed in one of the divided combustion chambers 5A and 5B at the time of engine low and medium loads, thus saving a fuel to enhancement of a fuel consumption.

Beside, in the above-described example, even in case a lean burning is performed in either one of the divided combustion chambers 5A and 5B of the four cylinders, a normal combustion is always performed in the other one of the divided combustion chambers 5A and 5B, thus all the cylinders are actuated, and, moreover, the valve actuator actuates the four valves 11A, 11B, 12A, 12B normally at all cylinders all the time. As a result, an impact to arise as in the case of actuating cylinder number variable engine is removed to ensure a smooth engine operation, thus enhancing a drive feeling. Still further, a trouble such as carbon stick or the like due to a long quiescence of the valve actuator may be prevented.

Besides, since the mixture in the always theoretical air-fuel ratio and the mixture in the air-fuel ratio changeable in accordance with the engine load are fed every each suction stroke alternatingly, the temperature raising of only one sides of the pistons 2 and the combustion chambers 5 of the respective cylinders can be prevented. As this result, the temperature in the respective cylinders can be made substantially even and a thermal stress decreases to prevent a thermal deformation, a sealing efficiency is thus ensured, and an abnormal firing may be prevented in addition.

Figure 6:
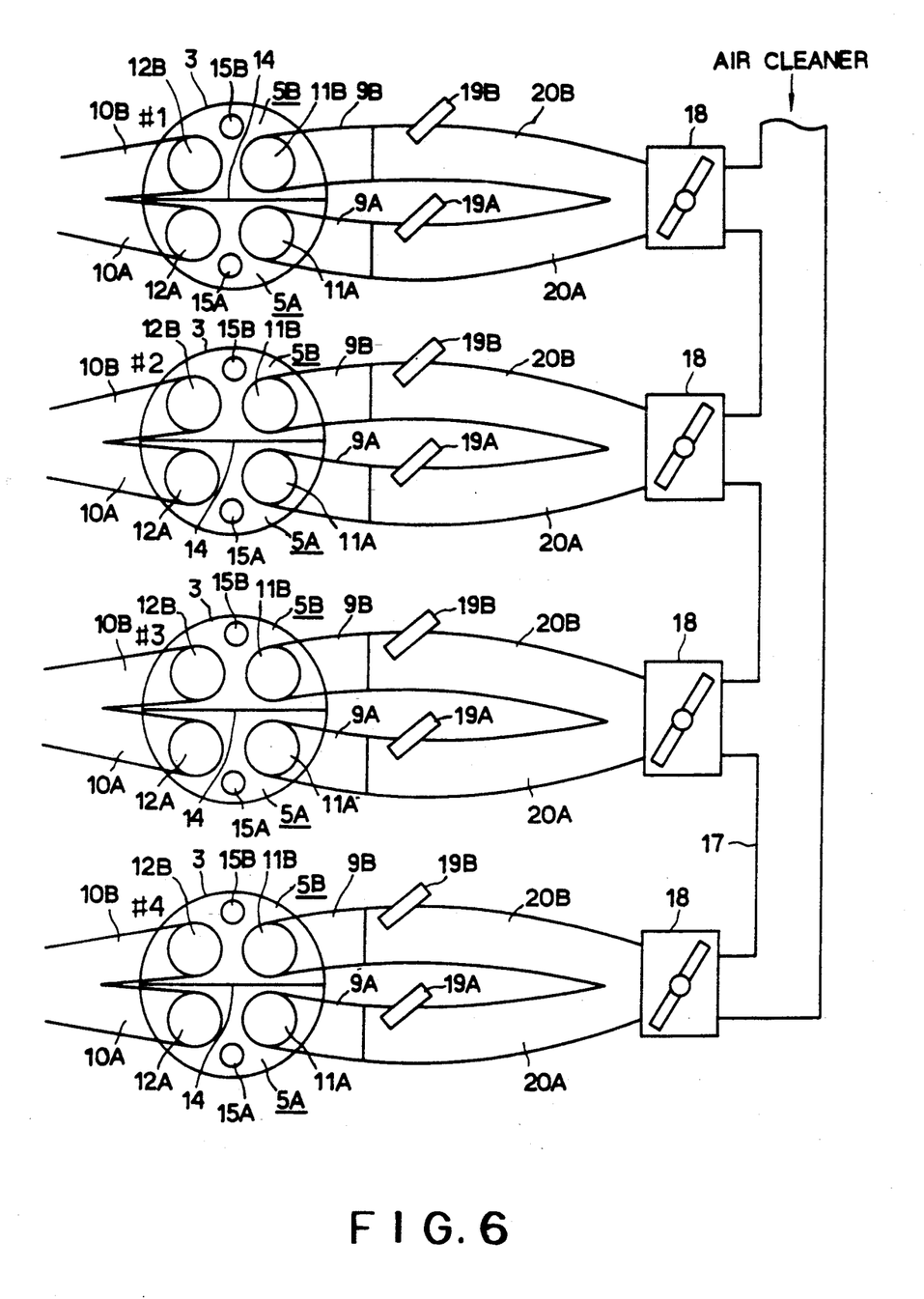
FIG. 6 is a schematic view showing a relation between a combustion chamber and a suction system of an engine in a second example of the four-stroke cycle engine relating to this invention.
Figure 7:
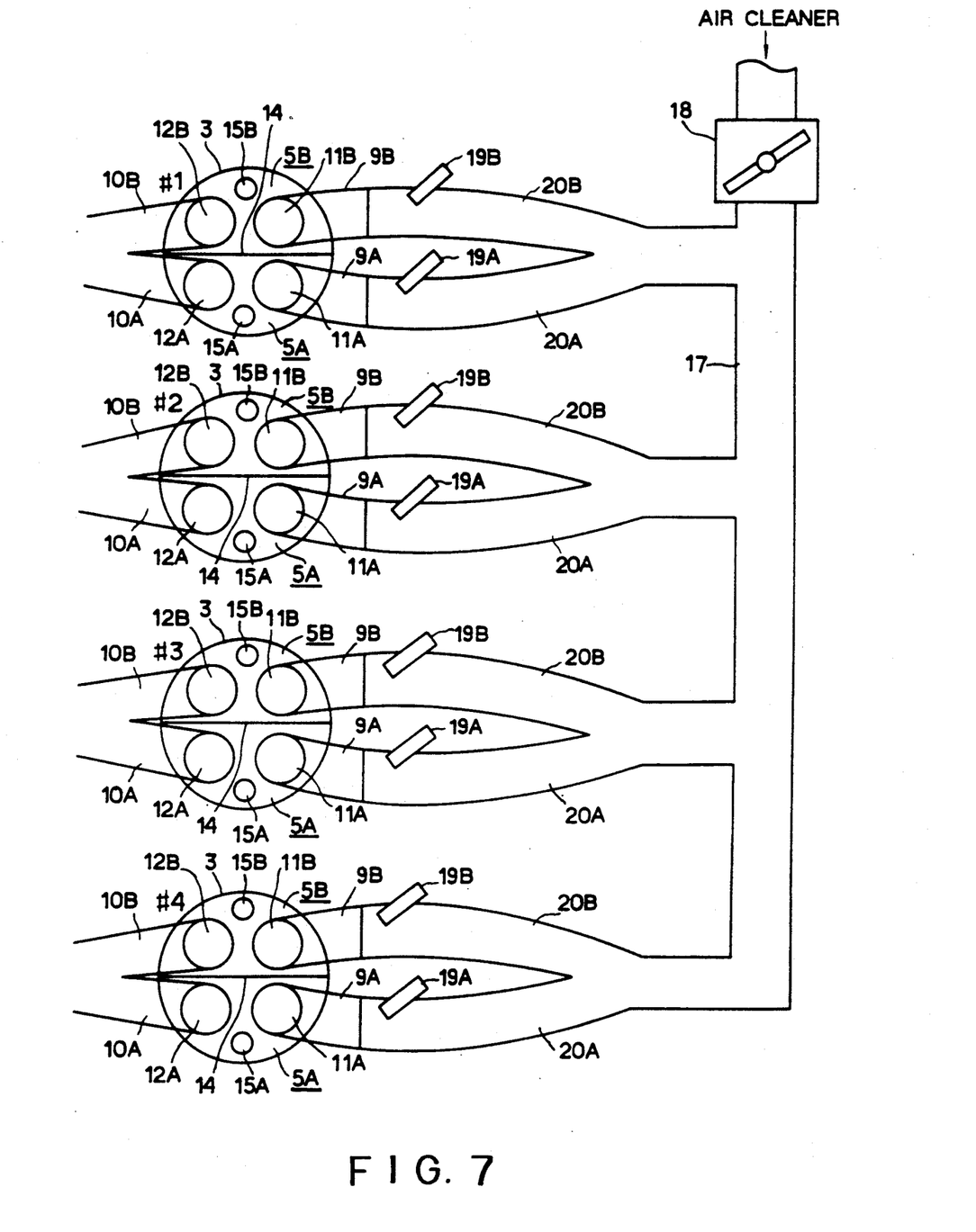
FIG. 7 is a schematic view showing a relation between a combustion chamber and a suction system of an engine in a third example of the four-stroke cycle engine relating to this invention.
Figure 8:
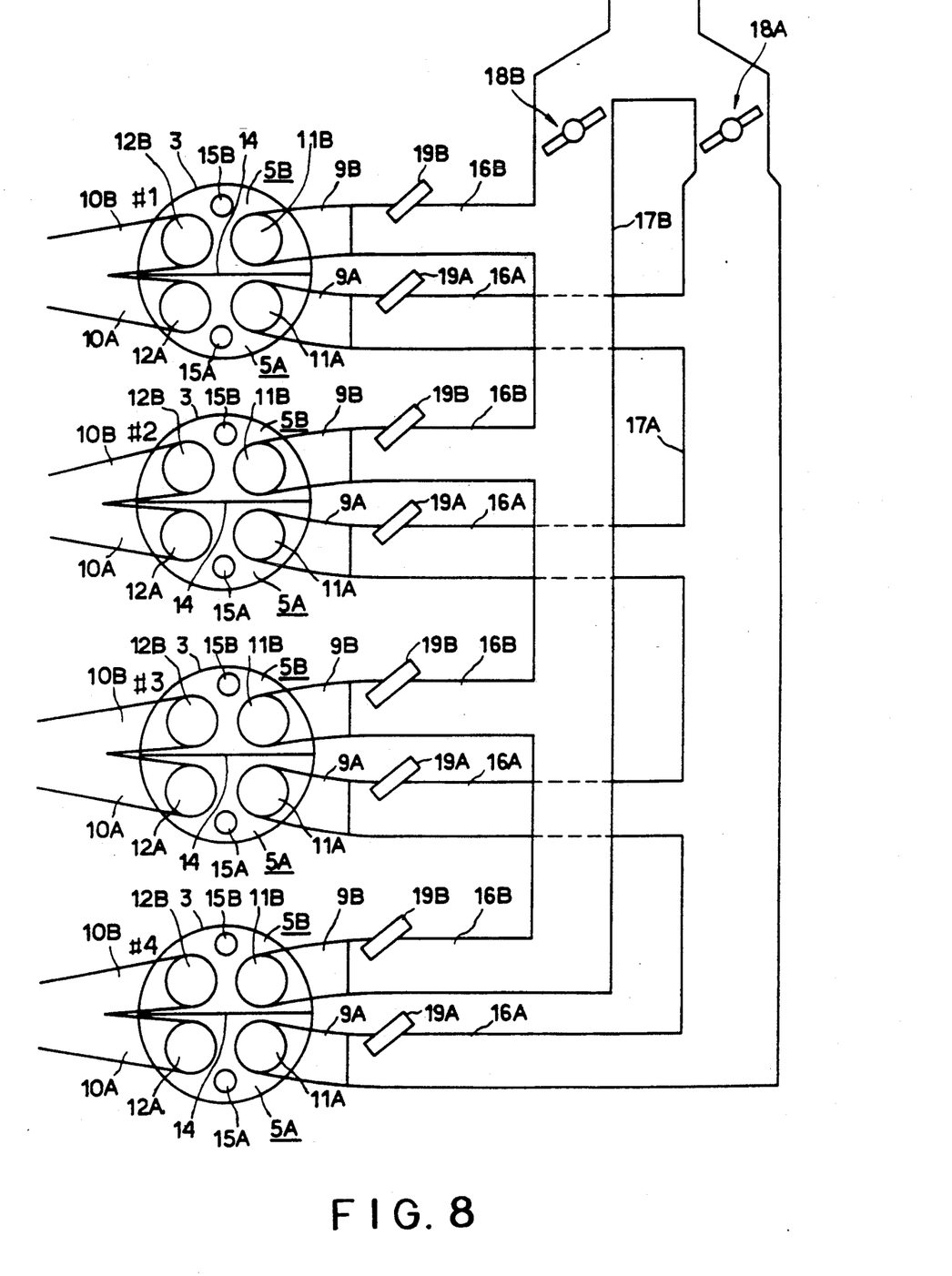
FIG. 8 is a shcematic view showing a relation between a combustion chamber and a suction system of an engine in a fourth example of the four-stroke cycle engine relating to this invention.

FIG. 6, FIG. 7, and FIG. 8 are conceptional drawings showing combustion chambers and suction systems of second example, third example, and fourth example of the four-stroke cycle engine of the first embodiment according to this invention, respectively.

In the second example shown in FIG. 6, the construction is such that an L-side suction manifold 20A and an R-side suction manifold 20B are made to join together on an upstream side, and one throttle valve 18 is provided at the junction in each cylinder.

In the third example shown in FIG. 7, the throttle valve 18 given in the second example is provided upstream of the surge tank 17 instead of providing at the junction of the L-side and R-side suction manifolds 20A and 20B, thus the throttle valve 18 working in common to each cylinder.

Further, in the fourth example given in FIG. 8, the construction is such that the L-side suction manifold 16A and R-side suction manifold 16B in the first example of FIG. 4 are coupled respectively to the L-side surge tank 17A and the R-side surge tank 17B, and both the L and R-side throttle valves 18A and 18b are coupled to an upstream sides of the L- and R-side surge tanks 17A and 17B, respectively.

Further, it is to be understood that in the illustrations of FIGS. 6 to 8 representing the second and fourth examples of the first embodiment, the sensors 26 and 27 and the CPU 28 are not described for the sake of convenience and the descriptions thereto do not also made herein, but substantially the same or identical locations thereof and descriptions as those made with reference to the first example with reference to FIG. 4 are applied to the second to fourth examples with no difficulty.

According to these second to fourth examples, the number of throttle valves can be reduced and a cost can be cut.

In the above examples, in one of the divided combustion chamber 5A and 5B supplied with a mixture with the air-fuel ratio changing according to an engine load, an ignition of the L-side or R-side ignition plug 15A or 15B may be cut according to a density of the mixture. Additionally, in each of the above-described eamples, a carburettor may be used as a fuel feeder instead of the fuel injector. Further, the diaphragm, by which a combustion chamber is partitioned into the L-side divided combustion chamber 5A and the R-side divided combustion chamber 5B, may be formed only on a side of the piston 2 or only on a side of the combustion chamber 5 of the cylinder head 6.

This invention also provides a second embodiment in a modified aspect, which will be described hereunder with reference to FIGS. 9 to 13 in which like reference numerals are added to elements or members corresponding to those shown in FIGS. 1 to 8, and the specific features of this aspect of the invention may be said to reside in location of exhasust gas recirculation EGR units.

Particularly, the description relating to FIGS. 1 to 3 applied to the first embodiment are applied to this second embodiment substantially as it is. Then, the arrangements of FIGS. 4, FIG. 6, FIG. 7 and FIG. 8 corresponds to FIG. 9, FIG. 10, FIG. 11 and FIGS. 12 and 13, respectively, except for the incorporation of exhaust gas recirculation EGR units including EGR valves and pipes.

Figure 9:
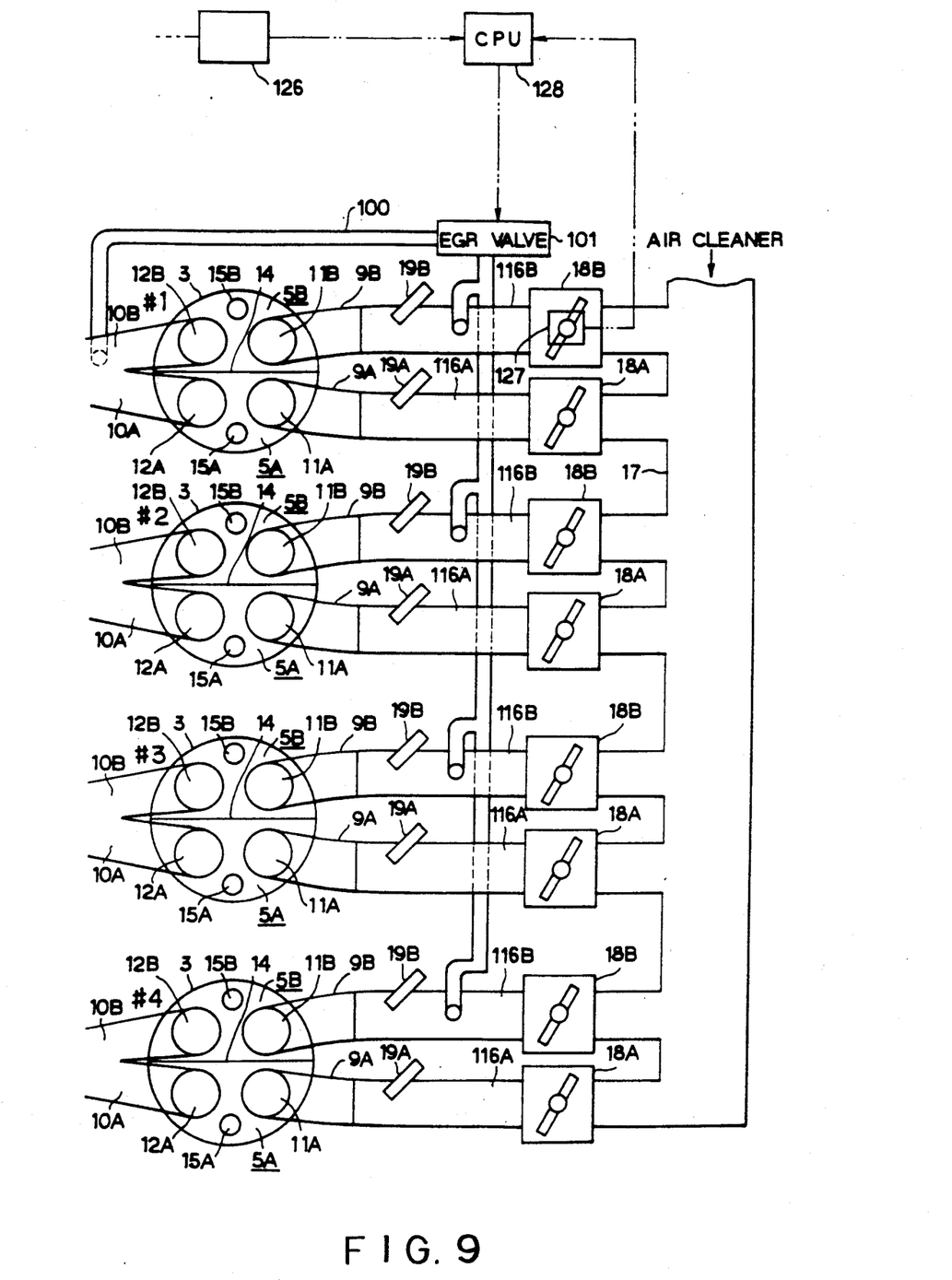
FIG. 9 is a schematic view showing a combustion chamber and a suction system of an engine in a first example of a second embodiment of the four-stroke cycle engine relating to this invention.

Referring to FIG. 9, showing the first example of the second embodiment, the L-side suction port 9A and the R-side suction port 9B of each cylinder 3 to which a mixture is introduced are independent, and an L-side suction manifold 116A and an R-side suction manifold 116B are connected to each port. These L-side and R-side suction manifolds 116A and 116B are connected to a surge tank 17, leading air from an air cleaner, not indicatd. The L-side suction manifold 116A is provided with an L-side throttle valve 18A and an L-side fuel injector 19A, and the R-side suction manifold 116B is provided with an R-side throttle valve 18B and an R-side fuel injector 19B.

Further, protions whereat each R-side suction manifold 116B and the L-side and R-side exhaust ports 10A and 10B are together coupled by EGR (exhaust gas recirculation) pipe 100, and an EGR valve 101 is disposed on the EGR pipe 100.

The degree of opening of the EGR valve 101 is controlled in response to the degree of opening of the throttle valve 18B (18A) with respect to the engine revolution number. Namely, the four-stroke cycle engine according to this embodiment is equipped with a sensor 126 for detecting the engine revolution number, a sensor 127 for detecting the degree of opening of the throttle valve 18B (18A) and a computing means such as central processing unit CPU 128 for controlling the air-fuel ratio to control the degree of opening of the EGR valve 101 in response to signals from the sensors 126 and 127.

In the operation, at the engine low load operation period in which the degree of opening of the throttle valve 18B (18A) is made small with respect to the engine revolution number, the degree of opening of the EGR valve 101 is made large under the control of the CPU 128 and, on the contrary, at the engine high load operation period in which the degree of opening of the throttle valve 18B (18A) is made large with respect to the engine revolution number, the degree of opening of the EGR valve 101 is made small under the control of the CPU 128. According to the operation control of the EGR valve 101, a supply of the exhaust gas led to the R-side suction manifold 116B of each cylinder 3 is adjusted according to an engine load through such operation of the EGR valve 101. Further, in the illustration of FIG. 9, a line from the CPU 128 is only connected to one sensor 127 for the throttle valve 18B, but lines may be connected to all the throttle valves 18A and 18B.

Further, the mixture in a predetermined air-fuel ratio is fed to each L-side divided combustion chamber 5A and R-side divided combustion chamber 5B by injection of a fuel from the L-side fuel injector 19A and the R-side fuel injector 19B. That is, an injection of the fuel from the L-side fuel injector 19A is adjusted so as to have a mixture to be fed to the L-side divided combustion chamber 5A at a theoretical air-fuel ratio all the time and also to keep the air-fuel ratio of a mixture including exhaust gas which is fed to the R-side divided combustion chamber 5B changing according to the engine load. Then, a combustion of the cylinder 3 shown in FIG. 9 proceeds in the order of #1-#3-#4-#2.

Here, the mixture including exhaust gas in the air-fuel ratio corresponding to an engine load refers to a mixture in a theoretical air-fuel ratio at the time of engine high load, to a mixture with the air-fuel ratio larger and thinner than the theoretical air-fuel ratio at the time of engine medium load, and to a dilute mixture with the air-fuel ratio still larger than that at the time of medium load when the engine is on a low load, including the case of exhaust gas only. Thus, a normal combustion is performed in the L-side divided combustion chamber 5A according to the mixture in a theoretical air-fuel ratio, and a lean burning is performed in the L-side divided combustion chamber 5A according to the mixture in a theoretical air-fuel ratio, and a lean burnig is performed in the R-side divided combustion chamber 5B according to the thin mixture coping with the engine load. However, since the mixture in a theoretical air-fuel ratio is fed also to the R-side divided combustion is carried out in the L-side and R-side divided combustion chambers 5A and 5B.

According to the above-described example, a mixture in a theoretical air-fuel ratio is fed to the L-side divided combustion chamber 5A, a mixture in an air-fuel ratio according to the engine load is fed to the R-side divided combustion chamber 5B, therefore a thin mixture with a large air-fuel ratio is fed to the R-side divided combustion chamber 5B at the time when the engine is on a low load and medium load. In consequence, a lean burning is performed in the divided combustion chamber 5B at the time of engine low load and medium loads, thus saving a fuel to enhancement of a fuel consumption.

Beside, in the above-described first example, even in case a lean burning is performed in each divided combustion chamber 5B of the four cylinders, a normal combustion is always performed in the divided combustion chamber 5A, thus all the cylinders being actuated, and moreover, the valve actuator actuates the four valves 11A, 11B, 12A, 12B normally at all cylinders all the time. As a result, an impact to arise as in the case of actuating cylinder number variable engine is removed to ensure a smooth engine operation, thus enhancing a driving feeling. Still further, a trouble such as carbon stick or the like due to a long quiescence of the valve actuator may be prevented.

Further, when the lean burning is carried out, combustion temperature generally gets high, and an oxygen is contained much in the mixture, whereby a nitrogen oxide reduction by a ternary catalyzer is impeded, thus increasing a formation of the nitrogen oxide $NO_x$. In the first example, the EGR valve 101 is operated to open at the time of engine low and medium load operations, and an exhaust gas substantially free from oxygen is introduced into the R-side suction manifold 116B, therefore combustion temperature gets low notwithstanding a lean burning being performed, further the mixture has a less content of oxygen, therefore a reduction of the nitrogen oxide $NO_x$ by a ternary catalyzer will never impeded, and thus a formation of the nitrogen oxide $NO_x$ may be suppressed.

Further, since the exhaust gas fed to the R-side divided combustion chamber 5B is high in temperature and low in density as compared with the atmosphere, a satisfactory effect in decreasing a pumping loss may result.

Besides, combustion temperature in the R-side divided combustion chamber 5B in which a lean burning is carried out is lower than that in the L-side divided combustion chamber 5A in which a normal combustion is carried out, however, since an exhaust gas of high temperature (about 300° C.) is fed to the R-side divided combustion chamber 5B, combustion temperatures of both the divided combustion chambers 5A and 5B become almost even. Thus, temperature within each cylinder is unified to prevent the one side only from getting high in temperature, a thermal stress decreases to prevent a thermal deformation, a sealing efficiency is thus ensured, and an abnormal firing may be prevented in addition.

FIG. 10, FIG. 11, FIG. 12 and FIG. 13 are conceptional drawings showing combustion chambers and suction systems of second example, third example, fourth example and fifth example of the second embodiment of the four-stroke cycle engine relating to this invention, respectively.

Figure 10:
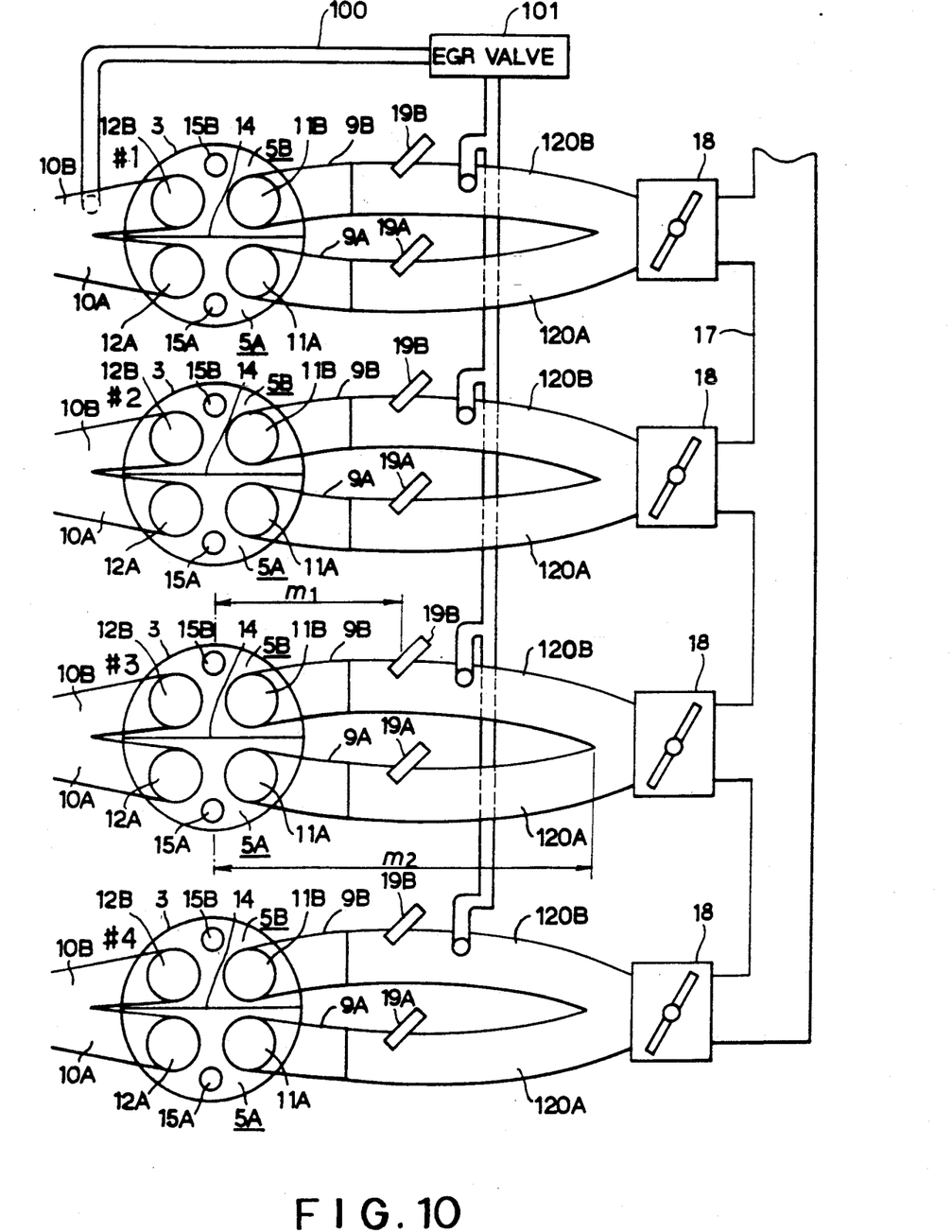
FIG. 10 is a schematic view showing a combustion chamber and a suction system of an engine in a second example of the second embodiment of the four-stroke cycle engine relating to this invention.
Figure 11:
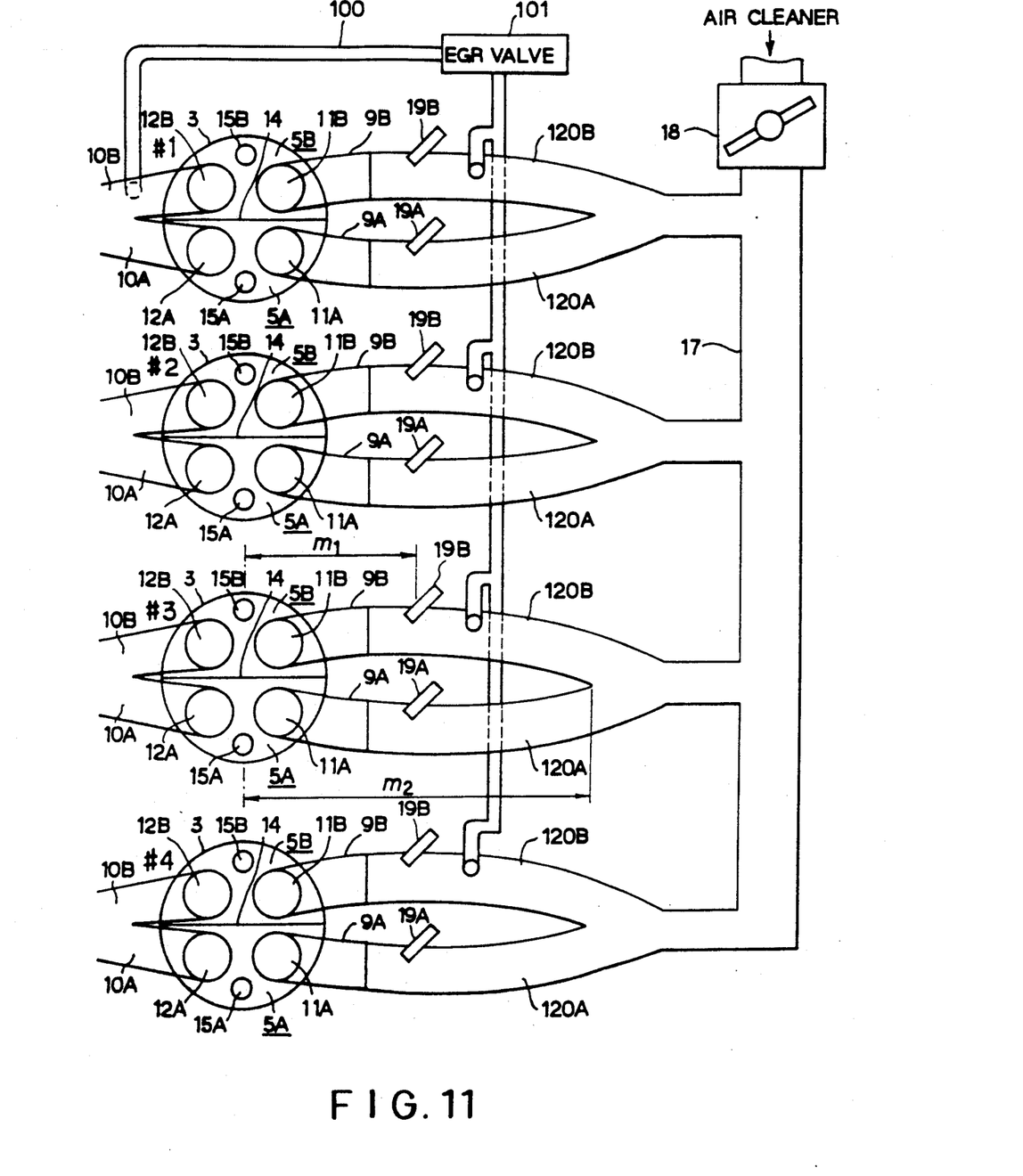
FIG. 11 is a schematic view showing a relation between a combustion chamber and a suction system of an engine in a third example of the second embodiment of the four-stroke cycle engine relating to this invention.

In the second example shown in FIG. 10, the construction is such that an L-side suction manifold 120A and an R-side suction manifold 120B are made to join together on an upstream side, a throttle valve 18 is provided at the junction, thus disposing each throttle valve 18 at every cylinders. Then, in the third example shown in FIG. 11, the throttle valve 18 given in the second example is provided upstream of the surge tank 17 instead of providing at the junction of the L-side and R-side suction manifolds 120A and 120B, thus the throttle valve 18 working in common to each cylinder. In the second and third examples, by selecting a distance $m_1$ from a center of the cylinder 3 to the EGR valve 101 and a distance $m_2$ to a junction of the suction manifolds 120A and 120B therefrom, the exhaust gas can be prevented from turning into the suction manifold 120A.

Figure 12:
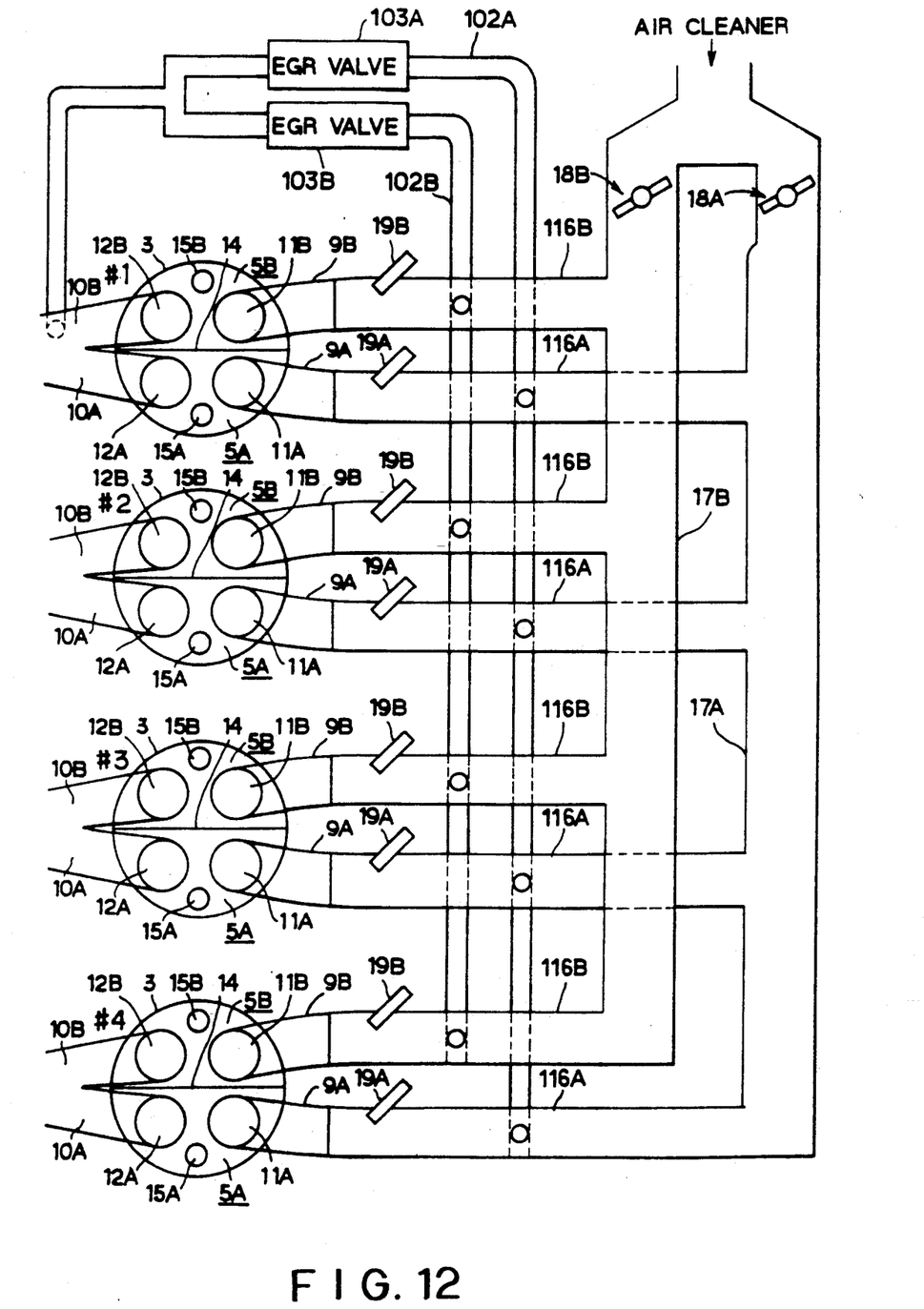
FIG. 12 is a shcematic view showing a relation between a combustion chamber and a suction system of an engine in a fourth example of the second embodiment of the four-stroke cycle engine relating to this invention.
Figure 13:
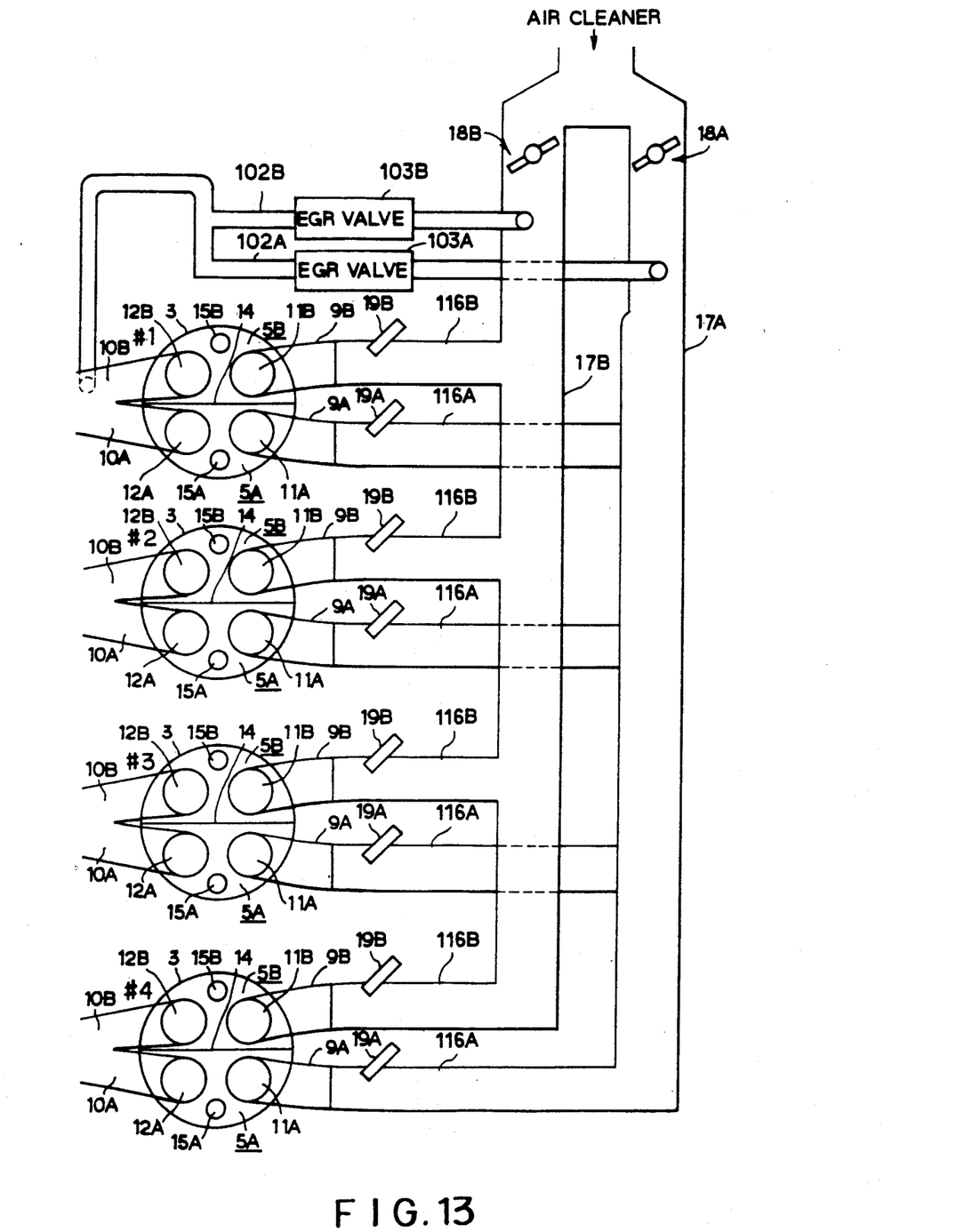
FIG. 13 is a schematic view showing a relation between a combustion chamber and a suction system of an engine in a fifth example of the second embodiment of the four-stroke cycle engine relating to this invention.

In the fourth example shown in FIG. 12, the construction is such that the L-side suction manifold 116A of the first example shown in FIG. 9 is connected to an L-side surge tank 17A, the R-side suction manifold 116B is connected to an R-side surge tank 17B, and the L-side throttle valve 18A and the R-side throttle valve 18B are provided on an upstream side of the L-side surge tank 17A and the R-side surge tank 17B, respectively. Further, in the fourth example, an L-side EGR pipe 102A and an R-side EGR pipe 102B for leading an exhaust gas are provided, the exhaust gas is fed from the R-side EGR pipe 102B to the R-side suction manifold 116B of each cylinder 3 as in the case of the first example to the third example, and the exhaust gas is also fed to the L-side suction manifold 116A of each cylinder 3 form the L-side EGR pipe 102A. In this case, an L-side EGR valve 103A and an R-side EGR valve 103B are provided on the L-side EGR pipe 102A and the R-side EGR pipe 102B respectively. The R-side EGR valve 103B operates in the same way as the EGR valve 101 of the first to third examples, and the L-side EGR valve 103A is operated to close totally at the time of high load and open minutely at the time of low and medium loads. The L-side EGR valve 103A is so operated to open minutely at the time of low and medium loads as to lower a combustion temperature in the divided combustion chamber 5A, thereby suppressing a generation of nitrogen oxides.

Further, in the fifth example given in FIG. 8, the construction is such that the L-side EGR pipe 23A in the fourth example of FIG. 7 is coupled to a downstream side of the L-side throttle valve 18A of the L-side surge tank 17A, and the R-side EGR pipe 23B is coupled to a downstream side of the R-side throttle valve 18B of the R-side surge tank 17B.

Further, it is to be understood that in the illustrations of FIGS. 10 to 13 representing the second to fifth examples of the second embodiment, the sensors 126 and 127, the CPU 128 and the EGR valves and pipes are not described and the descriptions thereof are also not made herein for the sake of convenience, but substantially the same or identical illustrations and descriptions as those made with respect to the first example described with reference to FIG. 9 may be applied to these examples with no dificulty.

According to the second to fifth examples described above, the number of throttle valves can be reduced, and a cost can be cut.

In this connection, in each of the above-described examples, in the divided combustion chamber 5B supplied with a mixture with the air-fuel ratio changing according to an engine load, an ignition of the R-side ignition plug 15B may be cut according to a density of the mixture when, for example, an exhaust gas only is fed at the time of engine low load. Additionally, in each of the above-described eamples, a carburettor may be used as a fuel feeder instead of the fuel injector. Further, the diaphragm, by which a combustion chamber is partitioned into the L-side divided combustion chamber 5A and the R-side divided combustion chamber 5B, may be formed only on a side of the piston 2 or only on a side of the combustion chamber 5 of the cylinder head 6.

What is claimed is:

1. In a four-stroke cycle engine in which a combustion chamber is formed by a piston accommodated in a cylinder block and a cylinder head disposed in the cylinder block and respective two suction valves and two exhaust valves are disposed in the combustion chamber, the improvement in which said combustion chamber is divided into two combustion sections each in which one of the suction valves and one of the exhaust valves are disposed, a mixture in a theoretical air-fuel ratio is fed into one of the divided combustion sections and a mixture in an air-fuel ratio corresponding to an engine load is fed into another one of the divided combustion sections, said air-fuel ratio being changed in response to the engine load.

2. A four-stroke cycle engine according to claim 1, wherein an engine revolution number is detected by a sensor, and a degree of opening of a throttle valve is detected by a sensor, an amount of fuel to be supplied is controlled by a control unit in response to signals from said both sensors, a mixture in a theoretical air-fuel ratio is fed to one of the combustion sections and the air-fuel ratio of a mixture to be fed into another one of the combustion sections is controlled to change the fuel supply amount in response to the degree of opening of the throttle valve with respect to the engine revolution numbers.

3. A four-stroke cycle engine according to claim 2, wherein at an engine low load operation period in which the degree of opening of the throttle valve is made small with respect to the engine revolution number, the air-fuel ratio of the mixture to be fed to another one of the combustion sections is made large and, on the contrary, at an engine high load operation period in which the degree of opening of the throttle valve is made large with respect to the engine revolution number, the air-fuel ratio of the mixture to be fed to another one of the combustion sections is made small.

4. In a four-stroke cycle engine in which a combustion chamber is formed by a piston accommodated in a cylinder block and a cylinder head disposed in the cylinder block and respective two suction valves and two exhaust valves are disposed in the combustion chamber, the improvement in which said combustion chamber is divided into two combustion sections each in which one of the suction valves and one of the exhaust valves are disposed, a mixture in a theoretical air-fuel ratio is fed into one of the divided combustion sections and a mixture including an exhaust gas in an air-fuel ratio corresponding to an engine load is fed into another one of the divided combustion sections, said air-fuel ratio being changed in response to the engine load.

5. A four-stroke cycle engine according to claim 4, wherein an engine revolution number is detected by a sensor, and a degree of opening of a throttle valve is detected by a sensor, an exhaust gas recirculation valve means is incorporated in association with the combustion chamber, a degree of opening of the exhaust gas recirculation valve means is controlled by a control unit in response to signals from said both sensors, a mixture in a theoretical air-fuel ratio is fed to one of the combustion sections and the air-fuel ratio of a mixture, including an exhaust gas through the exhaust gas recirculation valve means, is fed into another one of the combustion sections is controlled to change the air-fuel ratio of the mixture including the exhaust gas in response to the engine load.

6. A four-stroke cycle engine according to claim 5, wherein at an engine low load operation period in which the degree of opening of the throttle valve is made small with respect to the engine revolution number, the degree of opening of the exhaust gas recirculation valve means is made large and on the contrary, at an engine high load operation period in which the degree of opening of the throttle valve is made large with respect to the engine revolution number, the degree of opening of the exhaust gas recirculation valve means is made small.

* * * * *